(12) United States Patent
Phinney

(10) Patent No.: US 6,293,985 B1
(45) Date of Patent: *Sep. 25, 2001

(54) FERTILIZER GRANULATION METHOD

(75) Inventor: Robin Phinney, Calgary (CA)

(73) Assignee: Airborne Industrial Minerals, Calgary (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,265

(22) Filed: Apr. 17, 1998

(51) Int. Cl.$^7$ ................................................. C05C 9/00
(52) U.S. Cl. ........................................ 71/28; 71/29; 71/30
(58) Field of Search .................................... 71/28, 29, 30

(56) References Cited

U.S. PATENT DOCUMENTS

| | | | |
|---|---|---|---|
| H1070 | 7/1992 | Harrison et al. | 23/313 |
| T909,003 | 4/1973 | Hicks et al. | 260/555 |
| 2,214,145 | 9/1940 | Pike . | |
| 2,741,545 | * 4/1956 | Nielsson . | |
| 3,206,528 | 9/1965 | Coombs et al. | 264/117 |
| 3,295,950 | 1/1967 | Blouin et al. | 71/64 |
| 3,342,578 | 9/1967 | Harshman et al. | 71/29 |
| 3,348,938 | 10/1967 | Sherrington et al. | 71/28 |
| 3,408,169 | 10/1968 | Thompson et al. | 23/313 |
| 3,423,171 | 1/1969 | Hoppe et al. | 23/121 |
| 3,429,657 | 2/1969 | George et al. | 23/63 |
| 3,436,175 | 4/1969 | Atwood et al. | 23/119 |
| 3,449,106 | 6/1969 | Paden et al. | 71/13 |
| 3,528,767 | 9/1970 | Garrett | 23/89 |
| 3,533,776 | * 10/1970 | Coates et al. | 71/28 |
| 3,536,475 | 10/1970 | Trub | 75/3 |
| 3,539,326 | * 11/1970 | Otsuka et al. | 71/28 |
| 3,578,399 | 5/1971 | Boeglin | 23/121 |
| 3,617,243 | 11/1971 | Neitzel | 71/63 |
| 3,635,691 | 1/1972 | Earl . | |
| 3,656,891 | 4/1972 | Chemtob | 23/59 |
| 3,687,639 | 8/1972 | Barlow et al. | 23/300 |
| 3,711,254 | 1/1973 | McGowan et al. | 23/313 |
| 3,728,438 | 4/1973 | Nasyrov et al. | 423/551 |
| 3,785,796 | 1/1974 | Mann, Jr. . | |
| 3,808,051 | 4/1974 | Schoenholz et al. | 134/2 |
| 3,843,772 | 10/1974 | Boeglin | 423/551 |
| 3,853,490 | 12/1974 | Boeglin et al. | 23/313 |
| 3,928,015 | * 12/1975 | Siegel et al. | 71/28 |
| 3,967,930 | 7/1976 | Sadan | 23/296 |
| 3,983,211 | 9/1976 | Nasyrov et al. | 423/128 |
| 3,984,521 | 10/1976 | Nasyrov et al. | 423/120 |
| 3,998,935 | 12/1976 | Adams et al. | 423/552 |
| 4,045,543 | 8/1977 | Sardisco | 423/482 |
| 4,116,848 | 9/1978 | Schoenholz et al. | 252/90 |
| 4,129,642 | 12/1978 | Neitzel | 423/199 |
| 4,131,668 | 12/1978 | Sasaki et al. | 264/40.4 |

(List continued on next page.)

FOREIGN PATENT DOCUMENTS

| | | | |
|---|---|---|---|
| 2151569 | 12/1996 | (CA) | B01J/2/30 |
| 0 289 074 A1 | 11/1988 | (EP) | C05C/13/00 |
| 0 748 651 A1 | 12/1996 | (EP) | B01J/2/14 |
| 1383110 | 2/1975 | (GB) | C07C/126/08 |
| WO 97/39826 | 10/1997 | (WO) | B01J/2/14 |

*Primary Examiner*—Wayne Langel
(74) *Attorney, Agent, or Firm*—Paul S. Sharpe; Marks & Clerk

(57) ABSTRACT

Fertilizer granulation method for incorporating urea directly into the matrix of fertilizer pellets. The process involves introducing the urea in a liquid form into the matrix and then progressively cooling the mixture of pellet and urea to recrystallize the urea within the matrix of the pellet. The result is a substantially harder particle relative to pretreatment hardness, reduced solubility for longer lasting pellets and substantially reduced dust and other handling problems of the formed pellets.

7 Claims, 2 Drawing Sheets

U.S. PATENT DOCUMENTS

| | | | |
|---|---|---|---|
| 4,142,885 | 3/1979 | Heumann et al. | 71/28 |
| 4,174,382 | 11/1979 | Menche | 423/552 |
| 4,175,943 | 11/1979 | Jordaan et al. | 71/29 |
| 4,183,738 | 1/1980 | Carmon | 71/50 |
| 4,215,100 | 7/1980 | Sokolov et al. | 423/552 |
| 4,264,543 | 4/1981 | Valenta | 264/37 |
| 4,268,492 | 5/1981 | Sardisco et al. | 423/482 |
| 4,303,619 | 12/1981 | Kobayashi et al. | 422/205 |
| 4,323,386 | 4/1982 | Heggebo et al. | 71/35 |
| 4,330,319 | 5/1982 | Bexton et al. | . |
| 4,334,906 | 6/1982 | Young | 71/33 |
| 4,342,737 | 8/1982 | Iwashita et al. | 423/522 |
| 4,344,747 | 8/1982 | Henry | 425/140 |
| 4,353,852 | 10/1982 | Tse | 264/37 |
| 4,371,481 | 2/1983 | Pollock | 264/15 |
| 4,371,512 | 2/1983 | Sardisco et al. | 423/551 |
| 4,385,920 | 5/1983 | Dancy et al. | 71/36 |
| 4,420,468 | 12/1983 | Yamashita et al. | 423/482 |
| 4,436,710 | 3/1984 | Miyazaki et al. | 423/552 |
| 4,451,439 | 5/1984 | Maurel et al. | 423/55 |
| 4,528,039 | 7/1985 | Rubin et al. | 134/2 |
| 4,533,536 | 8/1985 | Bichara et al. | 425/551 |
| 4,554,004 | 11/1985 | Bierman et al. | 71/29 |
| 4,554,151 | 11/1985 | Worthington et al. | 423/551 |
| 4,562,058 | 12/1985 | Dancy et al. | 423/551 |
| 4,588,573 | 5/1986 | Worthington et al. | 423/552 |
| 4,589,904 | 5/1986 | Harrison et al. | . |
| 4,610,715 * | 9/1986 | Monaldi et al. | 71/28 |
| 4,668,242 | 5/1987 | Vitellaro et al. | 23/313 |
| 4,707,347 | 11/1987 | Vajna et al. | 423/552 |
| 4,743,287 | 5/1988 | Robinson | 71/12 |
| 4,842,790 | 6/1989 | Nunnelly | 264/117 |
| 4,943,308 | 7/1990 | Vanmarcke et al. | . |
| 5,043,007 | 8/1991 | Davis | 71/80 |
| 5,108,481 | 4/1992 | Shutt | 71/61 |
| 5,112,379 | 5/1992 | Young | . |
| 5,124,104 | 6/1992 | Holley | 264/113 |
| 5,152,821 | 10/1992 | Walter | . |
| 5,177,008 | 1/1993 | Kampen | 435/139 |
| 5,177,009 | 1/1993 | Kampen | 435/139 |
| 5,264,017 | 11/1993 | Van de Walle | 71/61 |
| 5,298,050 | 3/1994 | McLaughlin et al. | 71/63 |
| 5,322,532 | 6/1994 | Kurtz | 51/293 |
| 5,330,552 | 7/1994 | Rizzo | 71/30 |
| 5,352,265 | 10/1994 | Weston et al. | 71/29 |
| 5,366,534 | 11/1994 | Fischbein et al. | 71/63 |
| 5,378,259 | 1/1995 | Bassetti et al. | . |
| 5,383,951 | 1/1995 | Cross et al. | . |
| 5,460,765 | 10/1995 | Derdall et al. | 264/117 |
| 5,529,764 | 6/1996 | Lampert et al. | 423/552 |
| 5,549,876 | 8/1996 | Zisner et al. | 423/199 |
| 5,552,126 | 9/1996 | Efraim et al. | 423/199 |
| 5,571,303 | 11/1996 | Bexton | . |
| 5,599,373 | 2/1997 | Zanuccoli | 71/21 |
| 5,624,649 | 4/1997 | Gal | 423/243.11 |
| 5,725,630 | 3/1998 | Roberts et al. | 71/11 |
| 6,013,216 | 1/2000 | Watanabe et al. | 264/117 |

\* cited by examiner

FERTILIZER GRANULATION METHOD

FIELD OF THE INVENTION

The present invention relates to a method for granulating fertilizer products and more particularly, the present invention relates to a method for impregnating urea into a fertilizer material and granulating a pellet.

BACKGROUND OF THE INVENTION

The augmentation of fertilizer compounds with a treatment of urea, typically by spraying or aerosol has been practiced in the art. The most undesirable aspect of the treatment stems from the fact that urea is water soluble and since it is currently applied topically, much of the compound is simply wasted by washing away from rain, irrigation etc. This is a costly procedure with limited efficacy. A product and procedure whereby the urea may be mixed or crystalized within the fertilizer matrix is required to overcome the wastage problem. The present invention solves this problem.

SUMMARY OF THE INVENTION

One object of one embodiment of the present invention is to provide an improved fertilizer product and method of incorporating urea from a source thereof into the fertilizer.

A further object of one embodiment of the present invention is to provide a method granulating a fertilizer feedstock, comprising the steps of:

providing a compound containing urea;

providing a source of ammonium sulfate in a size distribution of 3 mesh to about 10 mesh;

introducing the urea and the ammonium sulfate into a drum granulator;

maintaining a temperature in the drum granulator sufficient to keep the compound in a liquid state for mixture with the ammonium sulfate; and cooling the mixture to form urea bearing ammonium sulfate granules.

In order to facilitate easier particle rolling within the drum, the drum may be lined with rubber, Teflon™, neoprene, inter alia.

In view of the fact that the granulated pellets contain a relatively high degree of empty interstitial space by virtue of the crystalline structure, this space provides a particularly useful volume within which to recrystallize urea.

In accordance with a further object of one embodiment of the present invention, there is provided a fertilizer granule, comprising:

a potassium granule containing about 20% empty interstitial volume; and urea in the volume.

In terms of the type of urea compounds that may be used in the practicing of the present invention, examples include urea formaldehyde, urea-ammonium orthophosphate, urea-ammonium polyphosphate, urea form etc. Other suitable examples which are compatible with the chemistry involved will be appreciated by those skilled in the art.

A still further object of one embodiment of the present invention is to provide a method granulating a fertilizer feedstock, comprising the steps of:

providing a compound containing urea;

providing a source of potassium sulfate in a size distribution of 3 mesh to about 10 mesh;

introducing the urea and the potassium sulfate into a drum granulator;

maintaining a temperature in the drum granulator sufficient to keep the compound in a liquid state for mixture with the potassium sulfate; and cooling the mixture to form urea bearing potassium sulfate granules.

For enhancing wettability of the feedstock, a surfactant may be added. The surfactant lowers the surface tension of the fertilizer product sufficiently so that the urea can flow into the fertilizer. This is of significant value when the mixture of urea and fertilizer is cooled to above the melting point of the urea since the result is recrystallization of the urea within the matrix of the fertilizer.

A still further object of one embodiment of the present invention is to provide a method granulating a fertilizer feedstock, comprising the steps of:

providing a compound containing urea;

providing a source of potassium chloride in a size distribution of 3 mesh to about 10 mesh;

introducing the urea and the potassium chloride into a drum granulator;

maintaining a temperature in the drum granulator sufficient to keep the compound in a liquid state for mixture with the potassium chloride; and cooling the mixture to form urea bearing potassium chloride granules.

Intra matrix recrystallization of the urea has been found to substantially increase desirable properties of the so formed granules. Typically, the break strength of the urea bearing pellets or granules exceeds 7 kilograms. This feature is beneficial in that hard particles do not create large quantities of dust; do not break, crumble, etc. during shipping, provide a modified solubility and facilitate a use for urea which would not have been possible based on the current methodology in the art.

Yet another object of the present invention is to provide a method granulating a fertilizer feedstock, comprising the steps of:

providing a compound containing urea;

providing a source of potassium nitrate in a size distribution of 3 mesh to about 10 mesh;

introducing the urea and the potassium nitrate into a drum granulator;

maintaining a temperature in the drum granulator sufficient to keep the compound in a liquid state for mixture with the potassium nitrate; and cooling the mixture to form urea bearing potassium nitrate granules.

Having thus generally described the invention, reference will now be made to the accompanying drawings illustrating preferred embodiments.

BRIEF DESCRIPTION OF THE DRAWINGS

Similar numerals employed in the text denote similar elements.

DETAILED DESCRIPTION OF THE PREFERRED EMBODIMENTS

Figure 1:
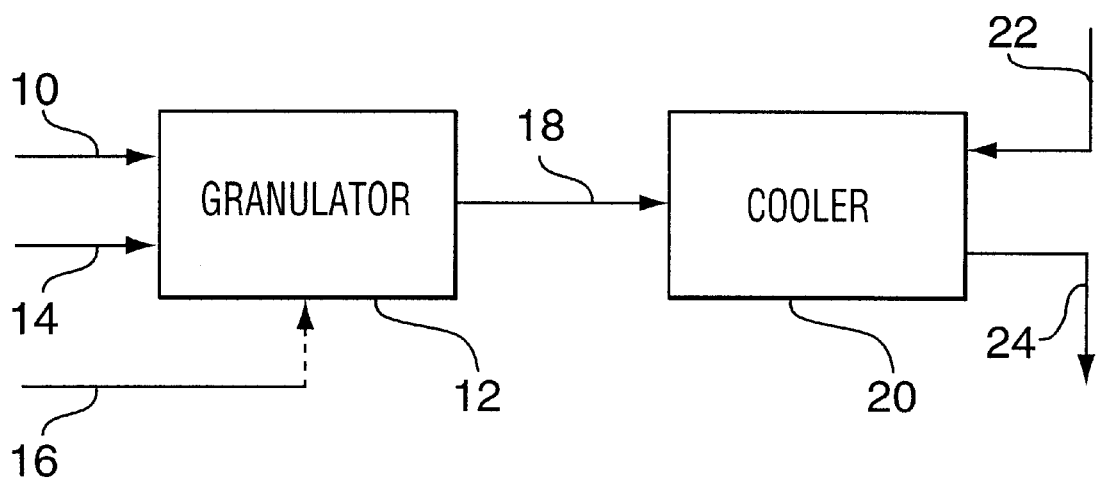
FIG. 1 is a schematic illustration of the apparatus for practicing the method.

Referring now to FIG. 1, numeral 10 represents the fertilizer feedstock which may be potassium chloride, potassium sulfate, ammonium sulfate, inter alia. The feedstock 10 is taken from a source thereof, for example, a pan granulation circuit (not shown).

The feedstock 10 is in a size distribution of between about 3 mesh to about 10 mesh. The material is introduced into a drum granulator 12. Suitable drum granulators will be appreciated by those skilled in the art. In addition to the feedstock 10 being introduced into 10 drum 12, there is also introduced a source of urea bearing compound 14. The urea may be introduced into granulator 12 in a liquid state or granulator 12 may be heated sufficiently so that the urea in the urea bearing compound is liquified. As a further possible alternative, the initial feedstock may be heated sufficiently to induce melting of the urea in the compound.

As an optional step, depending upon the nature of the chemistry involved, a suitable surfactant 16 may be introduced into granulator 12 in order to facilitate transportation of the liquid urea into the fertilizer feedstock matrix. The mixture, broadly denoted by numeral 18 is then introduced into a cooling apparatus 20. The apparatus may comprise a further drum granulator, fluidized bed or any other suitable cooling apparatus which facilitates movement of the product as well. In order to induce crystallization of the urea within the feedstock product, cooling fluid is introduced to granulator 20 at inlet 22 in a countercurrent manner. The cooling fluid may comprise any fluid which is inert relative to the chemistry within the cooling apparatus 20. As an example, air may be introduced to the apparatus 20 for cooling the urea. Crystallization occurs at any point above the melting of urea (typically 110° C.) and the cooling air within the apparatus 20 reduces the temperature to approximately 65° C. to produce a product exiting the apparatus at 24.

Rotation and inclination of the drum granulator 12 and/or 20 will be appreciated by those skilled in the art. These parameters will depend on the nature of the feedstock among other factors.

Figure 2:
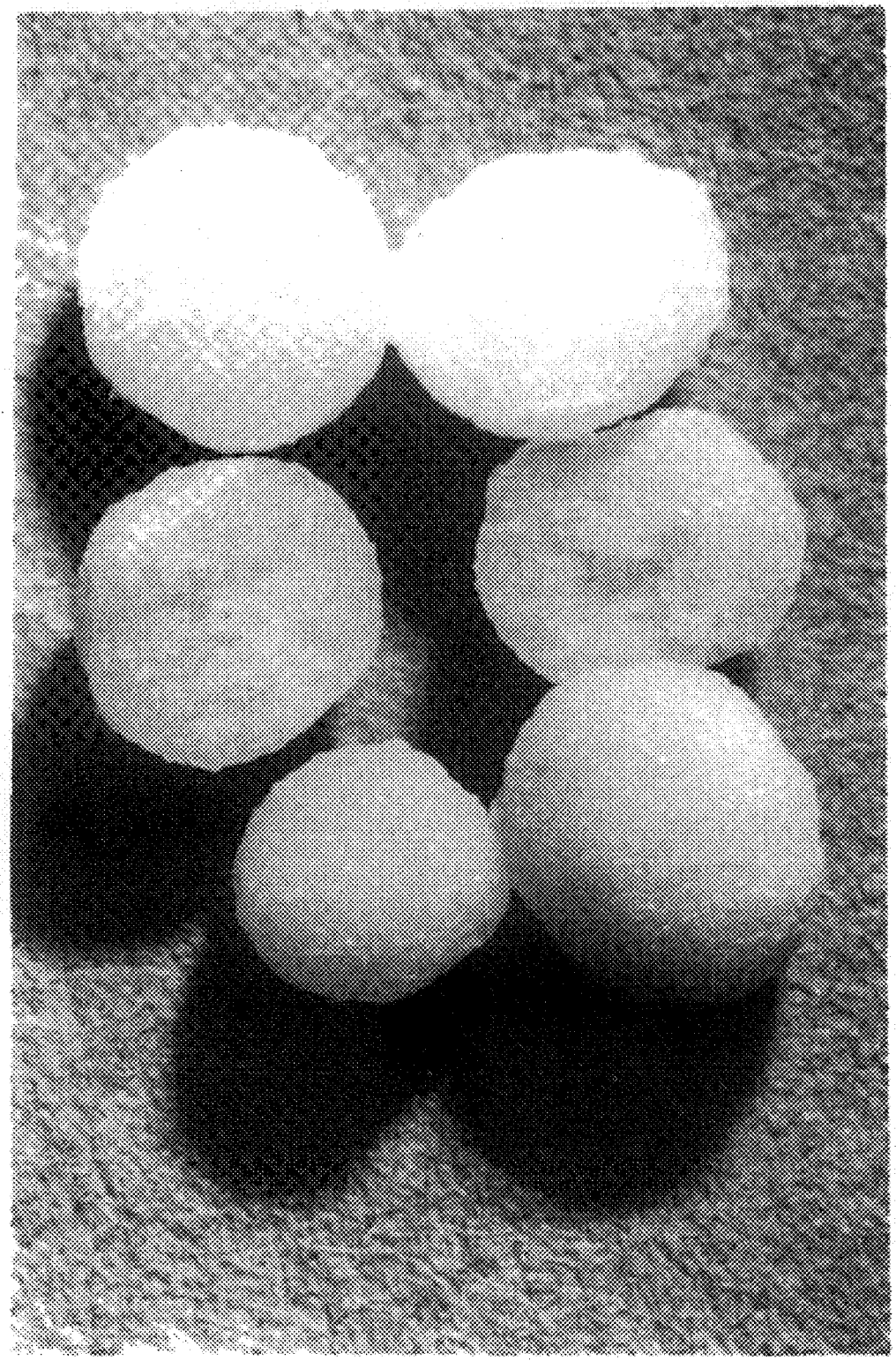
FIG. 2 is a photograph of an ammonium sulfate granule with urea recrystallized therein.

The product 24 is photographically illustrated in FIG. 2 where the granules are shown in a substantially spherical state as well as in cross section. It is clear from an examination of the cross sections that the urea is crystallized within the matrix of the fertilizer. As is known, the fertilizer granules typically have anywhere from 15% to 25% interstitial empty volume. This provides an ideal opportunity to introduce liquid urea for eventual recrystallization in the feedstock matrix.

It has been found that significant advantages flow from incorporation of the urea, which advantages include, for example, increased particle break strength. The break strength of ammonium sulfate pellets is typically about 2 kilograms to about 3 kilograms, whereas once the urea has been crystallized within the matrix, the break strength of the treated pellet generally exceeds 7 kilograms. In the case of potassium chloride and potassium sulfate, the pretreatment break strength of the granules is from about 2 kilograms to about 3 kilograms and the urea bearing granules demonstrate a break strength from about 7 kilograms to about 8 kilograms.

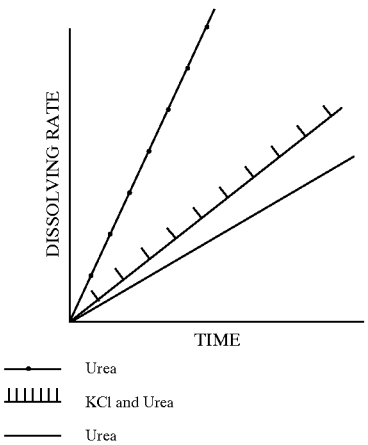

GRAPHICAL REPRESENTATION OF
DISSOLVING RATE AS A FUNCTION OF TIME

LEGEND:
—•— Urea
⊥⊥⊥⊥⊥ KCl and Urea
——— Urea

As illustrated in the graph, urea quickly dissolves. With the augmentation of potassium chloride, the rate of dissolution is significantly reduced, thus providing a longer lasting slow release fertilizer product which does not breakup/disintegrate, but rather is progressively dissolved with a substantially uniform reduction in diameter over time.

As indicated above, there are significant additional advantages that flow from the incorporation of the urea. One of the most attractive advantages with the present invention is the fact that the NPKS ratio can be effectively customized to yield any desired nitrogen, phosphorous, potassium, and sulfur ratio. In the example of FIG. 2, the NPKS ratio is 30-0-0-20.

Although embodiments of the invention have been specifically set forth herein, it will be understood that the invention is subject to significant variation without departing from the spirit, nature or scope of the claimed and described invention.

What is claimed is:

1. A method of forming a composite fertilizer, comprising the steps of:

providing a compound containing urea;

providing a source of pre-formed ammonium sulfate granules having interstitial space and in a size distribution of 3 mesh to about 10 mesh, said granules devoid of any compound containing urea;

introducing said compound containing urea and said granules of ammonium sulfate into a mixing drum;

maintaining said granules of ammonium sulfate in a solid state in the form of discrete granules to provide individual solid ammonium sulfate matrices into which said compound containing urea may flow;

maintaining said compound containing urea in a liquid state;

impregnating liquid urea into said interstitial space of said granules of ammonium sulfate;

cooling granules having urea impregnated therein with a cooling gas without accretion of said urea about said granules;

crystallizing said compound containing urea within said interstitial space in said mixing drum; and forming a composite fertilizer having discrete ammonium sulfate granules containing urea within said interstitial space of each of said granules of ammonium sulfate while retaining a size distribution of 3 mesh to about 10 mesh for said granules.

2. The method as set forth in claim 1, wherein each of said granules has a size distribution of about 5 mesh to about 10 mesh.

3. The method as set forth in claim 1, wherein said urea comprises urea formaldehyde.

4. The method as set forth in claim 1, wherein said urea comprises urea-ammonium orthophosphate.

5. The method as set forth in claim 1, wherein said urea comprises urea-ammonium polyphosphate.

6. The method as set forth in claim 1, wherein said urea comprises ureaform.

7. A method of forming a composite fertilizer, comprising the steps of:

provided a compound containing urea;

providing a source of fertilizer granules having interstitial space in a size distribution of 3 mesh to about 10 mesh, said granules devoid of any compound containing urea;

introducing said compound containing urea and said fertilizer granules into a mixing drum;

maintaining said granules in a solid state in the form of discrete granules to provide individual solid matrices into which said compound containing urea may flow;

maintaining said compound containing urea in a liquid state;

impregnating liquid urea into said interstitial space of said granules;

cooling granules having urea impregnated therein with a cooling gas without accretion of said urea about said granules;

crystallizing said compound containing urea in said interstitial space in said mixing drum; and forming granules containing urea within said interstitial space of each of said fertilizer granules while retaining a size distribution of 3 mesh to about 10 mesh for said granules.

* * * * *